United States Patent [19]
Fujiki et al.

[11] Patent Number: 5,220,475
[45] Date of Patent: Jun. 15, 1993

[54] ROTARY HEAD DRUM UNIT WITH GROOVES OR PROTRUSIONS ON A STATIONARY DRUM FOR LESSENING TAPE CONTACT DURING REWINDING

[75] Inventors: Makoto Fujiki, Tokyo; Hiroo Edakubo, Kanagawa; Toshihiko Nakajima, Kanagawa; Osamu Nagatsuka, Kanagawa; Akira Tomitaka, Kanagawa; Kiyoshi Kumagai, Kanagawa, all of Japan

[73] Assignee: Canon Kabushiki Kaisha, Tokyo, Japan

[21] Appl. No.: 560,146

[22] Filed: Jul. 31, 1990

[30] Foreign Application Priority Data

Aug. 4, 1989 [JP] Japan ................................. 1-203051
Aug. 4, 1989 [JP] Japan ................................. 1-203052

[51] Int. Cl.⁵ ............................................. G11B 15/61
[52] U.S. Cl. .................................................. 360/130.24
[58] Field of Search ........................... 360/130.24, 107

[56] References Cited

U.S. PATENT DOCUMENTS

4,257,076  3/1981  Shimizu et al. ................. 360/130.24
4,833,562  5/1989  Kochi et al. .................... 360/130.24

FOREIGN PATENT DOCUMENTS

1-154346  6/1989  Japan ............................. 360/130.24

*Primary Examiner*—Robert S. Tupper
*Attorney, Agent, or Firm*—Robin, Blecker, Daley & Driscoll

[57] ABSTRACT

Apparatus for recording or reproducing signals on a magnetic recording tape by wrapping the tape around a rotary drum unit of type including a stationary drum and a rotary drum supported by the stationary drum is provided with grooves which are formed in the stationary drum, the grooves being deeper than the depth of surface coarseness of the stationary drum and being located adjacent a point at which the tape parts from the stationary drum when the tape travels for recording or reproduction.

17 Claims, 6 Drawing Sheets

ROTARY HEAD DRUM UNIT WITH GROOVES OR PROTRUSIONS ON A STATIONARY DRUM FOR LESSENING TAPE CONTACT DURING REWINDING

FIELD OF THE INVENTION

This invention relates to magnetic recording or reproducing apparatus of type having a rotary magnetic head device and pertains more particularly to improvements in tape transport characteristics of the apparatus.

BACKGROUND OF THE INVENTION

Description of Related Art

The size of recording or reproducing apparatus of the above type, such as a video tape recorder (VTR), has been substantially reduced during recent years. The rotary drum unit of the apparatus has accordingly become smaller and the recording tape has come to be wrapped around the rotary drum within a smaller space, which has resulted in a complex shape for the traveling path of the tape.

FIG. 1 of the accompanying drawings shows by way of example the tape path of a compact 8 mm VTR, including point A, which is the point at which the tape leaves the rotary drum. FIG. 2 is an enlarged view of a part of the rotary drum unit of the VTR of FIG. 1, illustrating point A thereof and its environment.

Referring to FIG. 1, the rotary drum unit 12 has magnetic heads arranged on the periphery thereof at a given spacing distance and includes a rotary upper drum and a stationary lower drum. A capstan 13 with associated pinch roller 14 move the tape 7 at a given speed. The apparatus includes supply reel 15 and take-up reel 16.

The tape path shown in FIG. 1 is defined by guide posts 17 to 25. The guide posts 20 and 21 are disposed on a supply side and the guide posts 22 and 23 on a take-up side adjacent point A. The tape 7 is wrapped at a given angle around the drum unit 12 by the guide posts. A tension regulator pin 17 is provided for detecting the tension of the tape. The guide posts 18, 19, 24 and 25 further define the tape path beyond that defined by guide posts 20 to 23.

The tape transport characteristic of the described arrangement is now discussed. In normal recording or reproduction, the tape 7 is pulled out from the supply reel 15 at a given degree of tension. After this, the tape 7 is wrapped around the drum unit 12 while being supported by the guide posts. The capstan 13 and the pinch roller 14 then jointly act to move the tape 7 to allow it to be wound on the take-up reel 16. Under this condition, the tape tension gradually increases between the supply reel 15 and the capstan 13.

In the case of tape travel in the reverse direction, the tape 7 is pulled out from the take-up reel 16 and is immediately moved by the capstan 13 and the pinch roller 14. After that, the tape 7 is taken up by the supply reel 15 through the drum unit 12 and the guide posts. In this instance, since the tape 7 is wound on the supply reel 15 at a constant torque, the tape tension gradually decreases between the supply reel 15 and the capstan 13.

At the tape parting point A on the drum unit 12 near the capstan 13, the tape tension varies to a great degree with the traveling direction of the tape 7. When the tape 7 normally travels in the recording or reproducing direction, the tape is stretched relative to the guide posts in a plane, as is shown by broken lines in FIG. 2. On the other hand, in the event of reverse tape travel, a decrease in tape tension, in conjunction with the rigidity of the tape itself, causes the tape to travel in a curved state from the guide posts as is shown in FIG. 2 by full lines.

This tendency for tape tension variation is enhanced as drum diameter becomes smaller with such reduction in size of the apparatus, since the tape wrapping angle increases accordingly as the diameter of the rotary drum decreases.

Where the tape curves in its reverse travel, the tape wrapping angle increases relative to the drum unit 12. As a result, at the parting point between the drum unit 12 and the tape 7, the area of the tape 7 contacting with the drum unit 12 increases and this unstable tape travel increases the load imposed on the tape driving system. In a worst case, tape 7 begins to loosen and this presents a serious problem.

SUMMARY OF THE INVENTION

This invention is directed to the solution of the above-described problem. It is, therefore, a first object of the invention to provide a tape transport arrangement which provides for smooth tape travel.

It is a second object of the invention to provide a recording or reproducing apparatus which is capable of maintaining stable both tape tension and the state of contact of the tape with a head drum, even for small diameter head drums.

It is a third object of the invention to provide a recording or reproducing apparatus which prevents increase in the contact area of a tape with the lower drum of a drum unit when the wrap angle of the tape relative to the lower drum is increased by curving or slackening of the tape and also prevents, in the event of reverse tape travel, any loss of tape tension due to sticking of the tape to the lower drum when the drum is worn by tape travel by providing deep grooves for inciting air to flow in between the tape and the lower drum.

As alluded to above, in the course of reverse tape travel, an increase occurs in the wrap angle of the tape relative to the lower drum of a drum unit caused by curving or slackening of the tape. Wear of the part of the lower drum contacting the curved part of the tape can, by such tape travel over a long period of time, prevent air from flowing between the tape and the lower drum and eventually make reverse tape travel impossible. It is a fourth object of the invention to provide a recording or reproducing apparatus which is capable of preventing occurrence of this problem.

It is a fifth object of the invention to provide a magnetic recording or reproducing apparatus for recording or reproducing signals by wrapping a magnetic tape around a rotary drum unit, wherein there are provided grooves which are deeper than the surface coarseness of the tape guiding lower drum of the drum unit at least on the outside of and near to a tape parting point where the tape parts from the lower drum while the tape is traveling for normal recording or reproduction.

It is a sixth object of the invention to provide a recording or reproducing apparatus which supports a slack part of a tape when the tape is reversely traveling in such a way as to allow the tape to travel smoothly by preventing an increase in the angle at which the tape is wrapped around the lower drum.

It is a seventh object of the invention to provide a recording or reproducing apparatus which is arranged to ensure a stable traveling state of a tape irrespectively of the traveling direction of the tape without requiring complex manufacturing activity which would result in a great increase in cost. Realization of this objective has particular advantage in a VTR in which the tape has both a PCM recording area and a video recording area and is accordingly required to be wrapped at an increased angle around the drum.

Under this object, a magnetic recording or reproducing apparatus for recording or reproducing signals by wrapping a magnetic tape around a rotary drum unit is provided according to this invention with a projection or projections disposed in the vicinity of a tape parting point. The projections are in a position confronting the tape, but not contacting the tape when the tape is traveling for normal recording or reproduction and contacting the tape only when the tape is traveling in a direction reverse to the direction of normal recording or reproduction.

The above and further objects and features of the invention will become apparent from the following detailed description of embodiments thereof taken in conjunction with the accompanying drawings.

DETAILED DESCRIPTION OF THE PREFERRED EMBODIMENTS

Figure 1:
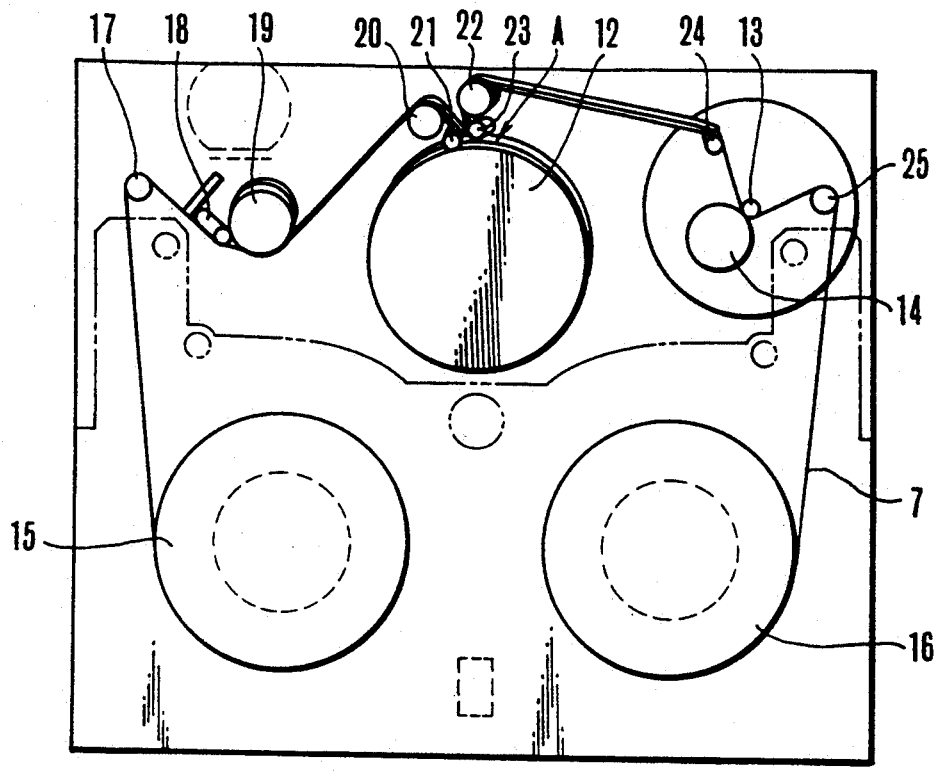
FIG. 1 shows by way of example a tape path in a compact size for an 8-mm type VTR.
Figure 2:
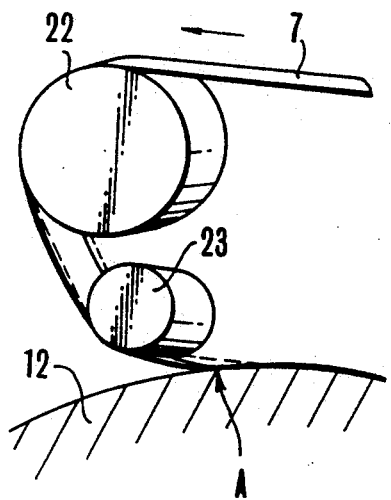
FIG. 2 is an enlarged view of a part of the same tape path in the vicinity of the tape parting point of a drum unit.
Figure 3:
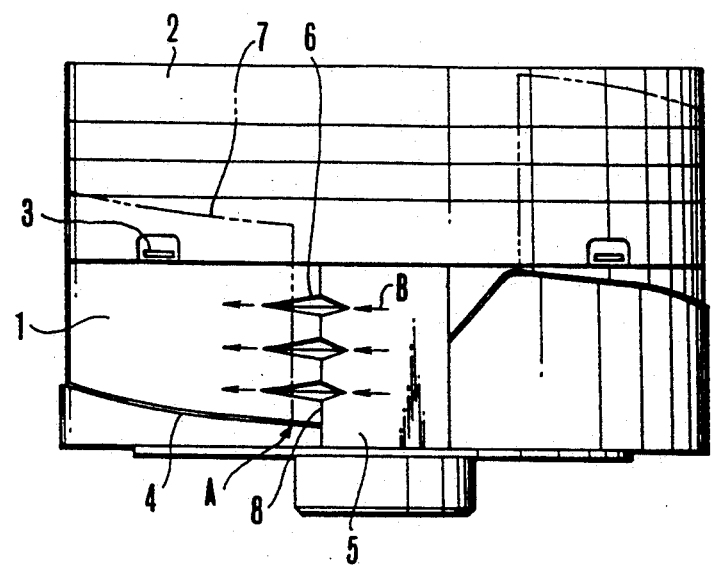
FIG. 3 is a side view of a drum unit arranged according to this invention as a first embodiment thereof.
Figure 4:
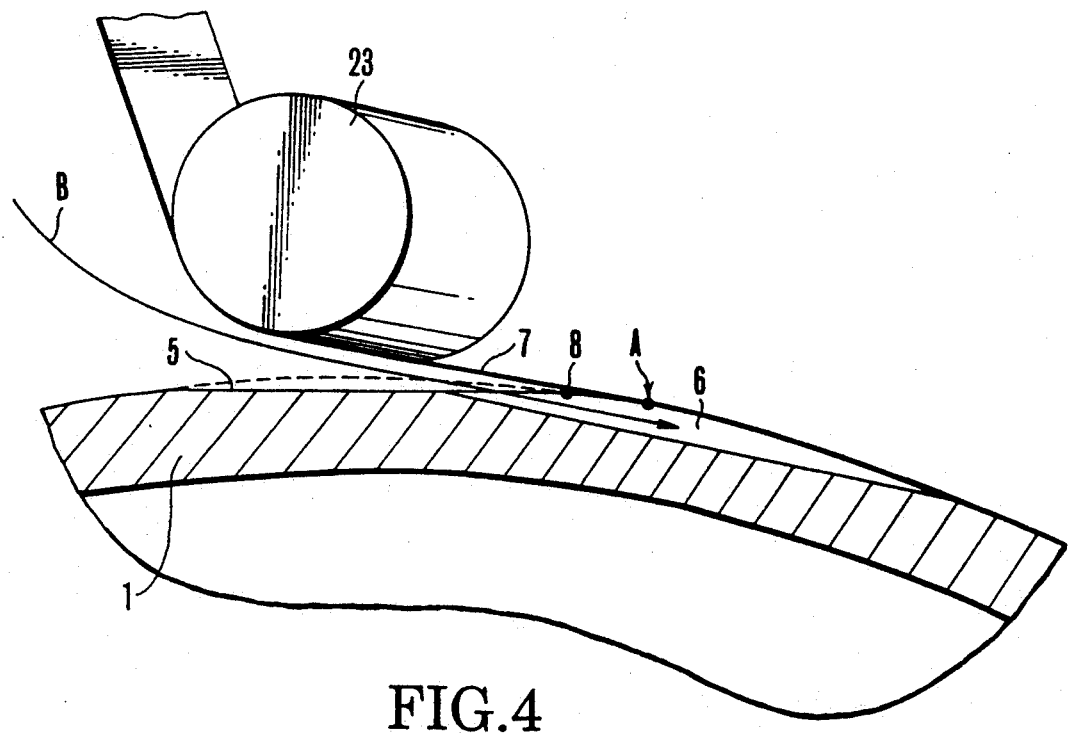
FIG. 4 shows the upper surface of the drum unit of FIG. 3.

A first embodiment of the invention is shown in detail in FIGS. 3 and 4. FIG. 3 is a side view of the drum unit of a first embodiment of the invention. FIG. 4 shows in an enlarged view the lower drum of the drum unit and a tape which is arranged to travel in contact with the lower drum in relation to grooves. Referring to these figures, the lower drum 1 is stationary. A reed 4 is provided on the lower drum 1 for guiding the tape. An upper drum 2 is rotatable relative to the stationary lower drum 1 by a motor which is not shown. A plurality of rotary heads 3 are disposed in given positions on the periphery of the upper drum 2. A cutaway part 5 is arranged to prevent the wrap angle of the magnetic tape 7 wrapped around the lower drum 1 from increasing when the tape 7 is curved or slackened downward by a decrease in tension which takes place in the event of reverse travel of the tape. A broken line in FIG. 4 shows the external circumferential face of the drum 1 before the cutaway part 5 is formed.

A plurality of grooves 6 are formed in the lower drum 1 on the tape exit side of the lower drum 1 and are located in the vicinity of a tape parting point A on one side thereof where the tape ceases to be wrapped around the drum. The grooves 6 are normally formed deeper than the coarseness of the tape traveling surface part of the lower drum 1.

These grooves 6 are also normally formed to be wider than the machine feeding pitch on the tape travel surface. The grooves 6 can be formed by means of a milling machine.

While the tape travels, the grooves 6 incite the inflow of air in between the tape 7 and the lower drum 1 as indicated by an arrow B in FIG. 4. This provides an air bearing between the tape 7 and the lower drum 1. The so-called sticking of the tape to the lower drum 1 can be prevented by virtue of the air bearing.

A part of the lower drum 1 around the dihedral line 8 between the cutaway part 5 and the arcuate part of the lower drum 1 can be worn off by the curving of the tape resulting from reverse travel of the tape through the use of the drum over a long period of time. In such event, the inflow of air between the tape 7 and the lower drum 1 is nonetheless still aided by the grooves 6, which are deeper than the worn part. Therefore, the tape can be smoothly transported. Further, the contact area of the drum 1 with the tape 7 is lessened by the provision of the plurality of wide grooves 6 so that the contact area can be prevented from being increased by the curving of the tape.

Figure 5:
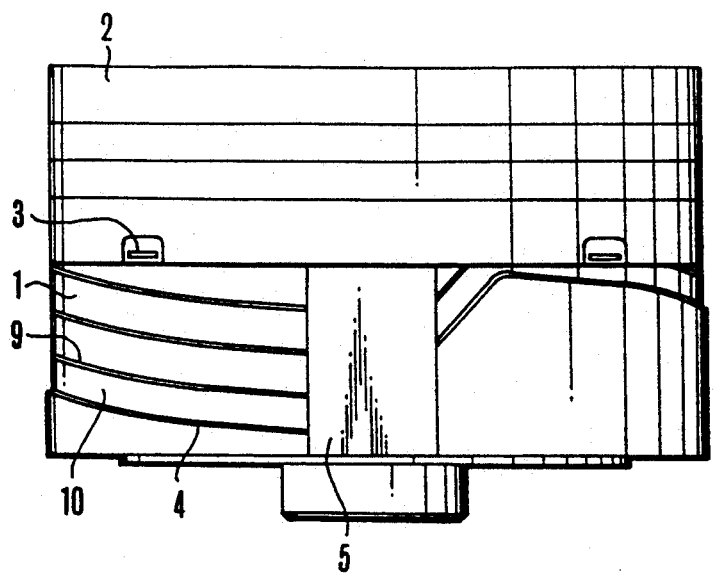
FIG. 5 is a side view of a drum unit arranged as a second embodiment of the invention.
Figure 6:
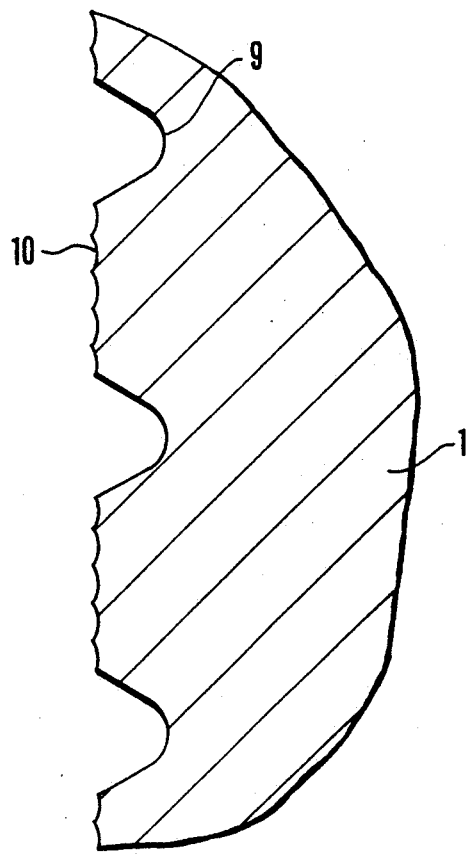
FIG. 6 shows the surface coarseness of the lower drum of the drum unit of the second embodiment.

FIGS. 5 and 6 show a second embodiment of the invention in detail. The same parts as those of FIGS. 3 and 4 are indicated by the same reference numerals. It is a feature of the second embodiment that the grooves for preventing the tape from sticking are formed simultaneously with machining work on the lower drum. FIG. 5 is a side view showing the drum unit of the second embodiment. FIG. 6 shows the coarseness of the tape travel surface of the lower drum 1. A reference numeral 10 denotes the coarseness of the tape travel surface obtained by normal machining work on the lower drum 1. Numerous grooves measuring 1 S (1 micrometer) in depth are formed at the pitch (or intervals) of 0.05 to 0.15 millimeter in general. A numeral 9 denotes deep grooves which are deeper than the depth of the coarseness of the tape travel surface of the lower drum. During the process of machining the tape travel surface of the lower drum, the deep grooves are formed by periodically increasing the cutting degree of a cutting edge at every given feeding extent (pitch). In the case of this specific embodiment, the deep grooves are formed, for example, at the pitch of about 0.5 to 1 millimeters and measure about 10 S (10 micrometers) to 20 S (20 micrometers) in depth, respectively. Unlike the first embodiment shown in FIG. 3, the grooves 9 are machined simultaneously with the surface while using one and the same machine tool by just changing the cutting degree. About the same advantageous effect as that of the first embodiment shown in FIG. 3 is attainable with the grooves 9.

Figure 7:
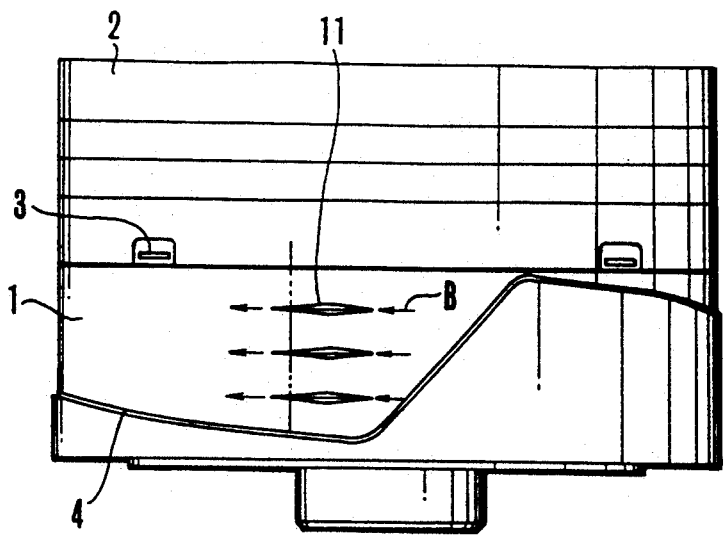
FIG. 7 is a side view of a drum unit which is arranged as a third embodiment of the invention.
Figure 8:
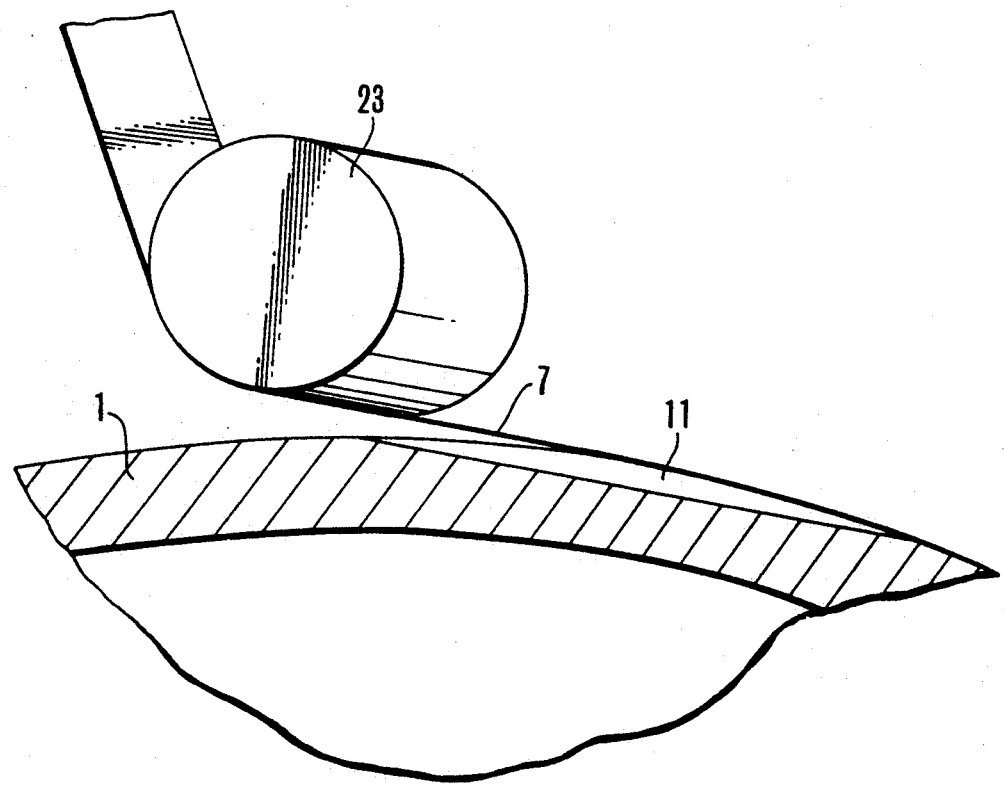
FIG. 8 shows the upper surface of the drum unit of FIG. 7.

FIGS. 7 and 8 show a third embodiment of the invention in detail. In FIGS. 7 and 8, the same parts as those of FIGS. 3 and 4 are indicated by the same reference numerals. FIG. 7 is a side view of the drum unit of the third embodiment. FIG. 8 shows a relation between a lower drum 1 and grooves 11. Unlike the first and second embodiments shown in FIGS. 3 and 5, the third embodiment is provided with no cutaway part 5 for preventing the tape from coming into contact with the lower drum. The lower drum 1 is in cylindrical shape.

On the tape exit side of the lower drum 1 are disposed a plurality of grooves 11. The grooves 11 are formed by means of a milling machine or the like on one side of and in the vicinity of the tape parting point from the lower drum. The grooves of the embodiments described are formed by machining with a milling machine or a lathe. However, these grooves of course can be formed by some other suitable means such as a laser machine, an etching process, a filing process, etc.

As described above, the grooves, which are deeper than the normal coarseness of the tape traveling surface of the lower drum, are formed in the lower drum near the tape parting point on the tape exit side thereof, where the drum ceases to be in wrapping contact with the tape.

These grooves prevent the wrapping contact from being increased by the curving or slack of the tape which occurs in the event of the reverse travel of the tape on the exit side of the lower drum (in the normal traveling direction of the tape) as a result of a decrease in tape pulling tension. Without this arrangement, the part of the lower drum which comes into contact with the curving (swelling or slack) portion of the tape would wear away through a long period of tape travel, at which time, the worn-out part would come to prevent the inflow of air in between the tape and the lower drum. This would eventually make reverse travel of the tape impossible. This problem can be solved by the provision of the grooves.

More specifically, the plurality of grooves are arranged to have a sufficient width for preventing the contact area from increasing between the tape and the lower drum. The grooves are also arranged to be sufficiently deep for inciting the inflow of air in between the tape and the lower drum, so that the loss of tension on the tape exit side of the drum under the reverse tape traveling condition can be prevented. The embodiment thus ensures stable reverse travel of the tape.

Figure 9:
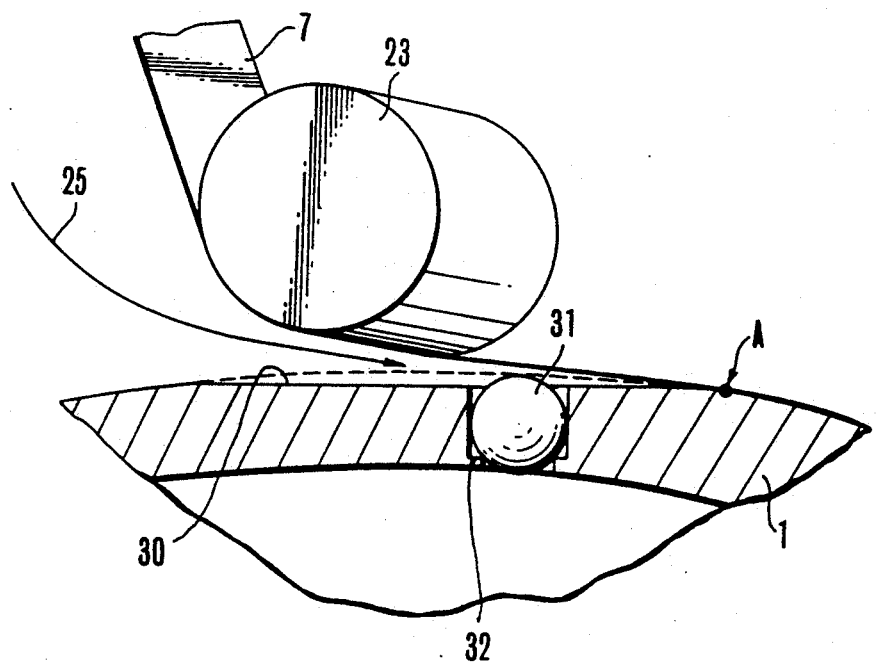
FIG. 9 is a sectional view of a lower drum arranged as a fourth embodiment of the invention.
Figure 10:
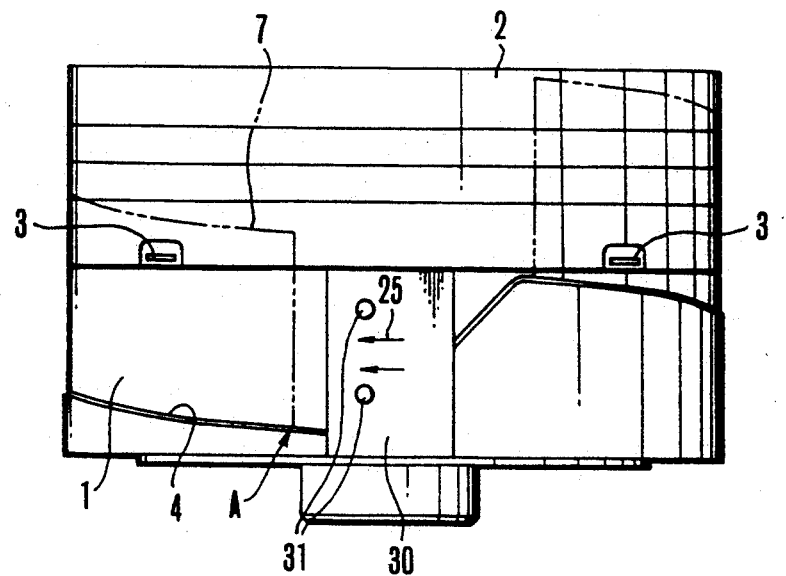
FIG. 10 is a side view of FIG. 9.

A fourth embodiment of this invention is shown in detail in FIGS. 9 and 10. FIG. 10 is a side view of a drum unit arranged as the fourth embodiment. FIG. 9 is an enlarged view showing a tape path arranged on the tape exit side of the lower drum of the same drum unit.

Referring to these drawings, the lower drum 1 is stationary. An upper drum 2 is rotatable relative to the lower drum 1 by means of a motor which is not shown. A plurality of rotary magnetic heads 3 are disposed on the periphery of the upper drum 2. A cutaway part 30 is arranged to prevent an increase in the angle of wrapping the tape around the lower drum when a decrease in tape tension on the tape exit side of the drum causes the tape to slacken and curve toward the drum with the tape travelling in the reverse direction. A broken line in FIG. 9 shows the outer circumferential face of the lower drum 1 before the cutaway part 30 is formed. A reference numeral 23 denotes a guide post disposed immediately after the exit point of tape travel in normal recording and reproduction. A numeral 7 denotes a tape. A reference symbol A denotes a tape parting point at which tape 7 departs from lower drum 1. A numeral 31 denotes projections which are arranged within cutaway part 30 to prevent any increased contact of the tape 7 and the lower drum 1 when the tape is caused to curve by a decrease in tension with the tape travelling in the reverse direction. The projections 31 are made of a stainless steel material or the like which is harder and more abrasion resistive than an aluminum material which is used for the drum unit, and are formed in a spherical (ball) shape. Each of the ball-like projections 31 is buried in a stepped hole 32 formed in the cutaway part 30 and is allowed to protrude to such an extent that it never comes into contact with the tape while the tape is traveling for normal recording or reproduction. However, it comes into contact with the tape to prevent the tape from sticking by facial contact with the surface of the drum when the tape happens to curve or slacken as mentioned above. Further, as is apparent from the side view given in FIG. 10, more stability is attainable and the advantageous effect can be furthered by the use of a plurality of balls 31 than use of a single ball 31 as protruding members.

As mentioned in the foregoing, the tape slackens between the drum 1 and the guide post 23 in the event of reverse travel of the tape. The tape 7 comes to be wrapped around the lower drum 1 further than the tape parting point A as designed. The excessive wrapping degree of the tape causes deterioration of tape transporting capability of the apparatus. This can be prevented by supporting the slackening part of the tape with the protruding members 31. Then, the degree of tape wrapping around the lower drum can be prevented from becoming excessive to ensure smooth tape travel.

Further, the protruding members 31 ensure the inflow of air in between the drum 1 and the guide post 23 in the direction of an arrow 25 to provide an adequate air bearing effect thereat.

Figure 11:
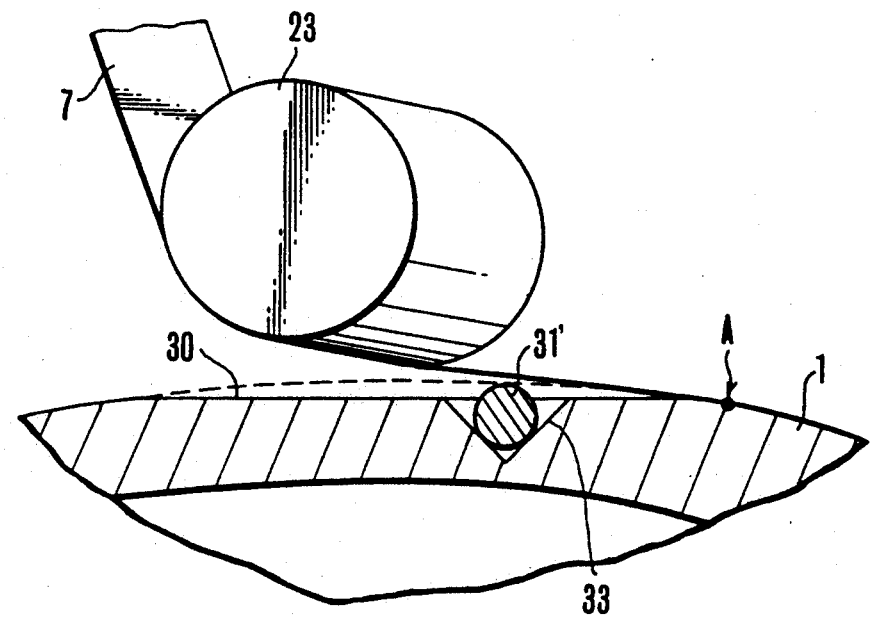
FIG. 11 is a sectional view of a lower drum arranged according to this invention as a fifth embodiment thereof.
Figure 12:
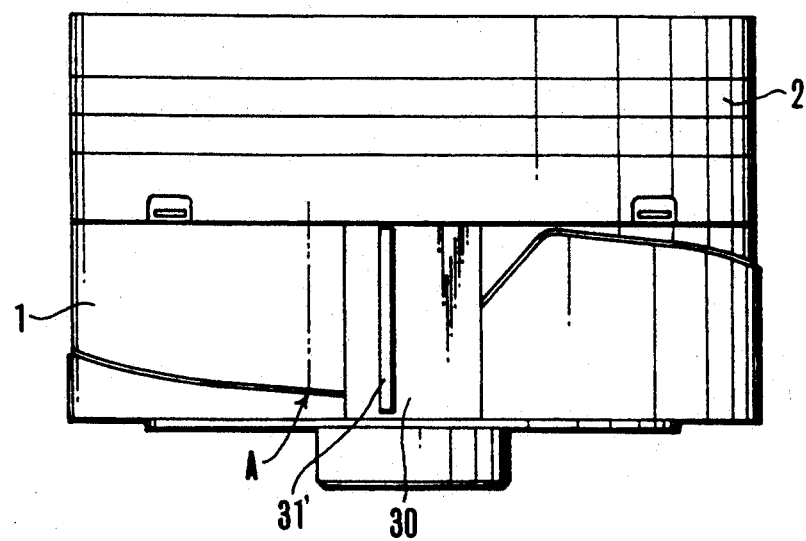
FIG. 12 is a side view of FIG. 11.

A fifth embodiment of this invention is shown in detail in FIGS. 11 and 12. In this case, a protruding member 31' which is made of a hard material such as stainless steel is provided in a V-shaped groove 33 which is formed in the lower drum 1 of a drum unit arranged as the fifth embodiment. The protruding member 31' is formed in a bar-like shape as shown in FIGS. 11 and 12. This shape effectively prevents the excessive wrapping degree of the tape around the lower drum 1 and sticking of the tape to the lower drum in the case of reverse travel of the tape. As compared with the use of the plurality of ball-shaped protruding members in the fourth embodiment, the fifth embodiment is advantageous in terms of cost.

In accordance with the arrangement of this embodiment, the protruding part is disposed on the outer side of a tape parting point A located on the tape exit side of the lower drum. The protruding part protrudes from the surface of the lower drum toward a tape portion between the tape parting point A and a guide post 23 which is located at a point immediately behind the tape exit part of the drum. This arrangement requires no complex machining work and ensures stable tape transport, irrespectively of the traveling direction of the tape without necessitating much increase in cost. The advantageous effect of the embodiment is notable particularly for a VTR wherein a PCM recording area is arranged along with a video recording area and the drum must have the tape wrapped around it at a large wrap angle.

What is claimed is:
1. A magnetic recording or reproducing apparatus for recording or reproducing signals by wrapping a magnetic tape around a rotary drum unit, comprising:
   a) a rotating drum; and b) a stationary drum supporting said rotating drum and guiding said magnetic tape to and from said rotating drum;

said stationary drum including at least one groove which is formed therein to a depth deeper than a depth of coarseness of a surface of said stationary drum and is located out of an area where said tape abuts said stationary drum adjacent a point where said magnetic tape parts from said stationary drum when said tape travels for recording or reproduction.

2. An apparatus according to claim 1, wherein said groove is formed at least at a location on said surface of said stationary drum beyond said tape parting point in a direction of travel of said magnetic tape.

3. An apparatus according to claim 1, wherein said groove consists of a plurality of grooves so formed on said stationary drum surface.

4. An apparatus according to claim 1 or 3, wherein said groove forms an air bearing which incites the inflow of air between said tape and said stationary drum.

5. An apparatus according to claim 3, wherein each of said grooves is about 10 to 20 micrometers in depth and and wherein said grooves are mutually spaced by about 0.5 to 1 millimeters.

6. An apparatus according to claim 1 or 3, wherein said groove extends along the traveling direction of said tape.

7. A guide device for guiding a tape, comprising a rotating drum and a stationary drum defining a position of said tape in such a way as to abut said tape and cause said tape to travel across both said rotary and stationary drums along a predetermined tape path, said rotating drum being rotatably supported on said stationary drum, said stationary drum having a recessed part which is formed therein only out of an area where said tape abuts said stationary drum, at a location adjacent a point of said stationary drum at which said tape parts from said stationary drum, said recessed part having a depth which is larger than the coarseness of the surface of said stationary drum, said recessed part preventing said tape from sticking to said stationary drum.

8. A device according to claim 7, wherein said recessed part consists of one groove or a plurality of grooves which extends or extend in the traveling direction of said tape-shaped recording medium.

9. A device according to claim 7, wherein said stationary drum and said rotary drum are components of a VTR.

10. A device according to claim 7, wherein said device supports said tape-shaped recording medium for both forward and backward travel.

11. A magnetic recording or reproducing apparatus for recording or reproducing signals by wrapping a magnetic tape around a rotary drum unit including a stationary drum and a rotary drum supported by said stationary drum, said apparatus comprising a protruding part formed on said stationary drum in a position to confront said tape out of an area where said tape abuts said stationary drum when said tape is traveling for recording or reproduction at a location adjacent a point where said magnetic tape parts from said stationary drum when said tape travels for recording or reproduction, said protruding part being so disposed as not to come into contact with said tape when said tape is traveling for recording or reproduction and to come into contact with said tape when said tape travels in a direction reverse to the traveling direction of said tape for recording or reproduction.

12. An apparatus according to claim 11, wherein said protruding part is made of a material which is harder than a material used for said stationary drum.

13. An apparatus according to claim 11, wherein said protruding part restricts the position of said tape when said tape is caused to slacken by a decrease in tension of said tape when the traveling direction of said tape is reversed.

14. An apparatus according to claim 11, wherein said protruding part consists of a plurality of protruding parts so formed on said stationary drum.

15. An apparatus according to claim 14, wherein said plurality of protruding parts are balls which are buried in the surface of said stationary drum.

16. An apparatus according to claim 14, wherein said plurality of protruding parts are disposed side by side perpendicularly to the traveling direction of said tape.

17. An apparatus according to claim 11, wherein said protruding part is in the form of a protruding bar which extends perpendicularly to the traveling direction of said tape.

* * * * *